United States Patent [19] [11] 3,877,410
Biven [45] Apr. 15, 1975

[54] POSITION INDICATOR DEVICE FOR VEHICLE STEERING WHEELS
[76] Inventor: Henry B. Biven, 2265 Park Ave., Norwood, Ohio 45212
[22] Filed: Nov. 30, 1973
[21] Appl. No.: 420,615

[52] U.S. Cl. ................................. 116/31; 116/133
[51] Int. Cl. ............................................. B60q 1/42
[58] Field of Search ........................ 116/31, 133, 124

[56] References Cited
UNITED STATES PATENTS

| | | | |
|---|---|---|---|
| 1,337,848 | 4/1920 | Pendziwiater | 116/31 |
| 1,660,641 | 2/1928 | Banning | 73/114 |
| 2,707,451 | 5/1955 | Brink | 116/31 |
| 2,934,035 | 4/1960 | Hardy | 116/31 |
| 3,072,091 | 1/1963 | Booth | 116/31 |

FOREIGN PATENTS OR APPLICATIONS

| | | | |
|---|---|---|---|
| 751,304 | 6/1933 | France | 31/ |
| 1,379,730 | 10/1964 | France | 116/31 |

Primary Examiner—S. Clement Swisher
Assistant Examiner—Denis E. Corr

[57] ABSTRACT

A position indicator device for vehicle steering wheels intended to be mounted on the dashboard of a vehicle and connected to the steering mechanism of the vehicle and having a pointer on a dial on the face thereof connected by a cable and appropriate gear mechanism to the vehicle steering mechanism to indicate the direction of the wheels in reference to the central axis of the vehicle. In addition, there is provided a distance indicator adapted to be connected to the odometer drive cable of a vehicle to indicate the distance traveled in feet and resettable by a reset button to activate the feet indicator in a manner to permit a vehicle driver to measure the exact length of a curbside parking space such that, in conjunction with the wheel direction indicator the vehicle operator is provided with an accurate guide to easily and precisely move the vehicle through the ideal path for curbside parking making reference to the direction indicator as well as the distance indicator.

1 Claim, 5 Drawing Figures

PATENTED APR 15 1975 3,877,410

POSITION INDICATOR DEVICE FOR VEHICLE STEERING WHEELS

BACKGROUND OF THE INVENTION

1. Field of the Invention

This invention relates generally to vehicles and more particularly to a novel device for indicating the position of the steering wheels of the vehicle in reference to the central axis of the vehicle along with providing a distance indicator which may be readily set in a manner to measure the length of a curbside parking place and which will also count-down the feet into the parking space as the vehicle is backed-up during the parking thereof so as to provide an accurate indicator to the vehicle which, in conjunction with the position indicator will provide a guide and assistance to the vehicle driver in the curbside parking of the vehicle.

2. Description of the Prior Art

In the operation of automotive vehicles the backing of a vehicle into a curbside parking space is probably one of the more difficult maneuvers and, if improperly handled, often results in material damage to the tires or wheels of the vehicle, as well as often resulting in the bumping of the vehicle between adjacent cars parked at either end of the curbside parking space into which the vehicle is being parked. For a vehicle driver not skilled in this parking maneuver, it often results in such driver tying up traffic by making repeated efforts at parking, with the waiting traffic soon becoming impatient and the vehicle driver thus being subjected to frustrations and aggravations in attempting to parallel park the vehicle in the curbside parking space.

In view of this problem, there have been developed in the prior art devices alleging to be aids to vehicle operators and provide guides for the parking of the vehicles, however such devices have been generally unsatisfactory for a number of reasons which include a high initial purchase and installation cost, are subjected to maintenance and repair problems, have a varying degree of accuracy, and/or require that the vehicle be parked in an unconventional and unusually difficult manuever requiring the steering wheels and the relationship of the vehicle to the parking space thus serving as a detriment to the vehicle driver when attempting to drive any other vehicle not equipped with the same type of guide device.

SUMMARY OF THE INVENTION

The present invention remedies and overcomes all of the deficiencies and disadvantages of presently available alleged parking guides and devices by providing a novel position indicator device for the vehicle steering wheels along with a distance indicator for use in measuring the exact length of the parking space into which it is desired to park the vehicle, the indicators operating in a clearly readable and continuous manner to provide both a continuous indication as to distance traveled by the vehicle during parking as well as the direction of the steering wheels such that the driver may back into a curbside parking space easily, quickly and through a direct ideal path for curbside parking. By use of the indicator devices of the present invention the driver is provided with an accurate guide to precisely coordinate the movement of the steering wheels with the movement of the vehicle as it is backed into the parking position.

It is a feature of the present invention to provide an aid for the curbside parking of an automotive vehicle to guide a vehicle driver to easily and precisely back a vehicle into a curbside parking space.

A further feature of the present invention provides an indicator device connected to the front steering wheels of the vehicle to mechanically indicate in a clear manner the position at all times of the wheels in reference to the central axis of the vehicle, this being both a guide to the parking of the vehicle as well as a guide to assist the vehicle driver in the driving of the vehicle as the position of the wheels will be immediately apparent to the vehicle driver to permit adjustment of the wheels before reversing or driving forwardly, such as when the vehicle is parked or in close proximity to other vehicles and it is important to note the position of the steering wheels before making any movement of the vehicle.

Yet still a further feature of the present invention is the provision of a position indicator device for the vehicle steering wheels along with a distance indicator for measuring the length of a curbside parking space or the like, the indicator devices being relatively simple in construction and therefore being readily manufactured at a relatively low cost and by simple manufacturing methods; they being possessed of few parts and therefore unlikely to get out of order; they being rugged and durable in construction and therefore may be guaranteed by the manufacturer to withstand many years of usage; they being easy to use and reliable and efficient in operation; they being installed as part of the original equipment of the vehicle, or being readily installed at a later date as an accessory item to the vehicle; and they being otherwise well adapted to perform the services required of them, these being among the desirable features and advantages which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENT

Figure 1:
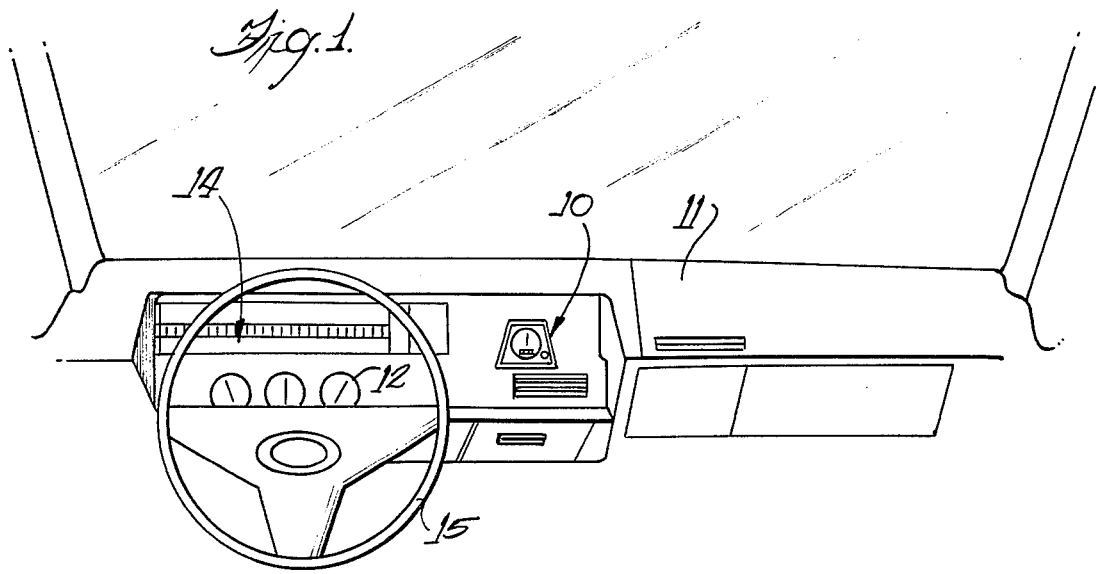
FIG. 1 is a front elevational view of a vehicle dashboard having the indicator device of the present invention mounted thereon.

Referring now to the drawings in detail there is illustrated a preferred form of a position indicator device for indicating the position of the vehicle steering wheels relative to the central axis of the vehicle, the device being constructed in accordance with the principles of the present invention and designated generally in its entirety by the reference numeral 10 and being shown in FIG. 1 mounted in a conventional dashboard 11 of a vehicle having a speedometer 12, which also includes an odometer, along with other associated conventional instrumentation generally designated by reference numeral 14 and a steering wheel 15.

The indicator device 10 includes a hollow box-like casing 20 having a back surface 21, a top surface 22, a bottom surface 23, and opposed side surfaces 24 and 25, such surfaces 21-25 defining interiorly thereof a compartment 26 opening out of the open front end of the body 20 and which is closed by a transparent face plate 27.

A dial 31 is disposed inwardly of face plate 27 and has calibrations 32 on each side of a center zero degree marker 33. A pointer 34 is pivoted at the center portion of the dial and is arranged to move either to the right or to the left of the center zero marker 26, depending upon the movement of the steering wheels 35 of the vehicle as will be later described. The pointer 34 is connected to one end of a flexible drive cable 41 with the cable extending outwardly of back surface 21 and terminating in a gear box 42 which is mounted on the protective casing 42' steering post 43 which is that post which rotates in one direction to move the wheels 35 in a first direction, and which rotates in the opposite direction to move the steering wheels in the opposite direction.

Figures 4, 5:
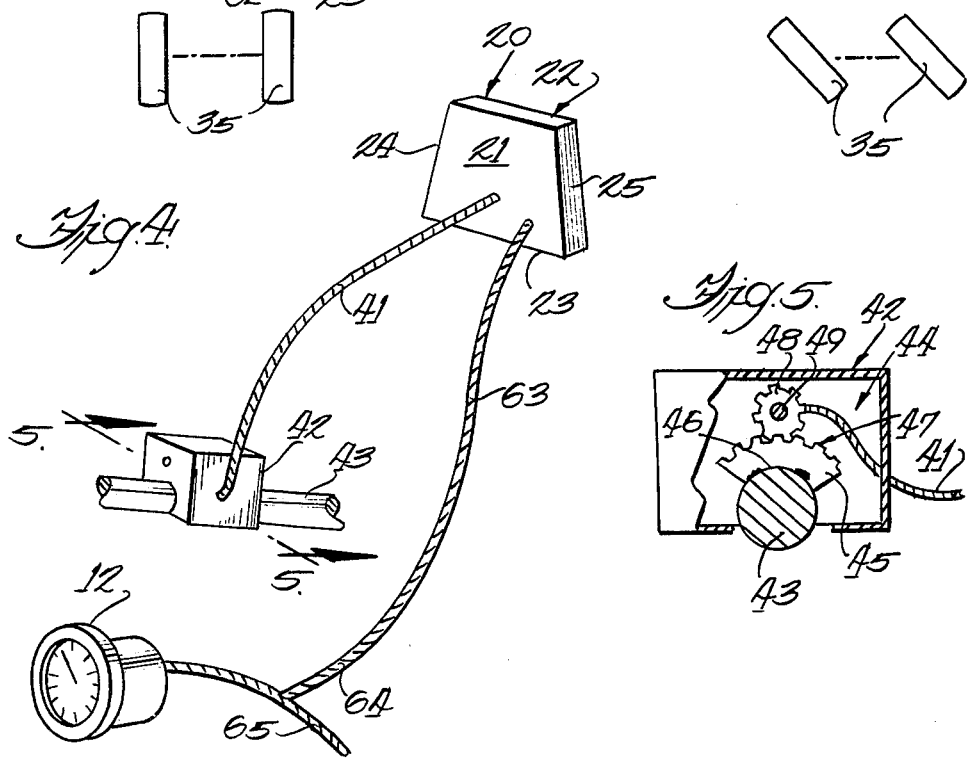
FIG. 4 is a perspective diagrammatic view illustrating the connection of the cables to components of the vehicle for driving operation therefrom.
FIG. 5 is an enlarged cross-sectional view taken along Line 5—5 of FIG. 4.

As seen in FIG. 5, gear assembly 42 is mounted on the casing 42' of steering post 43 with the gear assembly having an interior compartment 44 and in which is mounted an arcuate segment gear 45 which is welded or otherwise secured at its innermost edge 46 to a portion of the circumference of post 43, the outer edge of the segment gear 45 having teeth 47 disposed therealong which engage with toothed gear 48 which is pivotally mounted by pivot pin 49 in compartment 44 and which is drivingly connected to the opposite end of the flexible cable 41.

It is thus seen that as the post 43 rotates about its axis in opposite directions to effect the steering of the wheels 35, the interconnected gears 45 and 48 operate to rotatably drive flexible cable 41 in a manner to effect a similar rotative movement of pointer 34 relative to dial 31 such that the position of the wheels 35 relative to the central axis of the vehicle is accurately designated by reading the calibrations 32 which are pointed to by the pointer 34. Examples of typical readings are found in FIGS. 2 and 3 with FIG. 2 indicating the zero degree position where the wheels 35 are in alignment with the central axis of the vehicle, and with FIG. 3 illustrating the 45° position of the wheels 35 relative to the central axis of the vehicle.

Disposed beneath indicator 34 in dial 31 is a window 61 behind which is mounted a conventional type of odometer read-out assembly 62 which is drivingly connected to one end of a flexible cable 63 which extends outwardly of back surface 21 with the opposite end 64 of the cable 63 adapted to be connected to the conventional type of flexible drive cable 65 associated with the speedometer and odometer 12, the mechanism 62 being resettable to a zero reading by use of a reset knob 66 in the conventional manner. The mechanism 62 defines a distance indicator which measures distance in feet and which is intended for use by the vehicle driver pulling adjacent the curbside parking space into which it is wished to park the vehicle with the back end of the vehicle generally aligned with the back end of the parking space, after which the reset button 66 is used to reset the mechanism 62 to a zero reading, after which the vehicle driver pulls forwardly until the vehicle is adjacent the car parked at the front end of the parking space with the back end of the vehicle generally aligned with the back end of such parked car, this giving the vehicle driver a measurement of the length of the parking space.

Figures 2, 3:
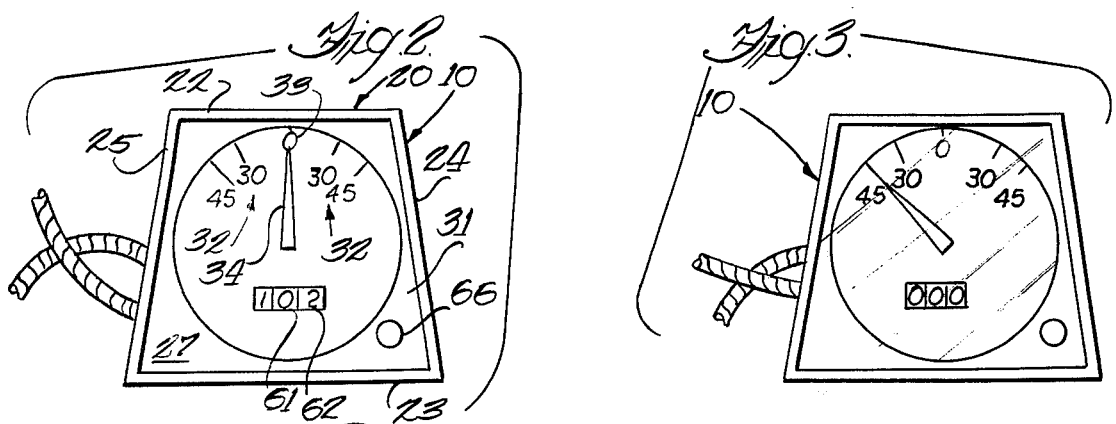
FIG. 2 is a front elevational view of the indicator device with the indicator indicating the position of the diagrammatically illustrated vehicle steering wheels shown therebeneath.
FIG. 3 is a front elevational view similar to FIG. 2 and illustrating the angled direction of the diagrammatically illustrated steering wheels relative to the central axis of the vehicle.

In operation, after having measured the length of the parking space, the vehicle driver visually views the mechanism 62 in conjunction with the pointer 34 as the vehicle operator beings to back the vehicle into the parking space, and when the driver reaches the point in backing up where the distance indicator 62 reads half of its previous reading, the driver turns the front wheels 35 until pointer 34 indicates the 45° calibration, such as seen in FIG. 3, with the driver then continuing to properly be guided back into the parking space such that the vehicle is properly parked in the curbside parking space upon a single attempt by the vehicle driver without having to make several attempts or having to shift the vehicle back and forth during the parking procedure.

In addition, the pointer 34 serves as a visual indication at all times to the driver as to the position of the steering wheels 35 relative to the central axis of the vehicle, this being important when the vehicle is in a parked position or between cars and the driver must know the position of the wheels before moving the vehicle either forwardly or rearwardly, this normally requiring the driver to visually view the actual wheel to determine the position thereof whereas by use of the present invention it is only required that the driver note the position of the pointer 34 to the exact position of the wheels 35.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A position indicator device intended for installation in a dashboard of a conventional automotive vehicle to provide visual indication of the orientation of the steering wheels of the vehicle relative to the central axis of the vehicle as well as to provide a distance travelled indication thereon, the device comprising, in combination:

a housing having a vertical back surface, a horizontal top surface, a horizontal bottom surface, opposed side wall surfaces, and an open front wall surface;

a compartment defined interiorly of said surfaces and opening outwardly of said open front surface of said housing;

a transparent member affixed to the front peripheral edges of said top, bottom and side wall surfaces of said housing to close said open front of said housing;

a dial member disposed inwardly of said transparent member inside said housing and visible through said transparent member;

calibration markings disposed about a portion of said dial member, said markings including a zero marker index line centrally of said dial member along the vertical axis thereof with angular degree markings disposed on each side of said zero marking, said calibration markings corresponding to angular movements of the steering wheel of the vehicle relative to the longitudinal central axis of said vehicle;

an indicating pointer disposed intermediate said dial member and said transparent member and having its base end rotatively affixed through a central aperture provided in said dial member with said pointer rotatable in a manner overlying the face of said dial member and parallel thereto with its pointing end adapted to traverse the calibration markings for designating specific calibration markings during operation thereof;

an elongated flexible drive cable having one end drivingly connected to said pivot mounted base of said indicating pointer to effect movement of said pointer, the flexible cable extending outwardly of the back surface of said housing and terminating in an opposite end adapted to be connected to a gear mechanism which, in turn, is drivingly connected to a steering post of said vehicle for driving said cable rotatively in proportion to the rotative movement of said steering post;

said gear mechanism interposed between said free opposite end of said flexible cable and said steering post comprising:

a hollow rectangularly shaped box-like housing mounted adjacent a circumferal portion of said steering post in a manner to enclose a portion of said steering post;

a chamber defined interiorly of said casing and opening directly into communication with said steering post;

said casing being fixedly mounted on said vehicle with said steering post being rotatable relative thereto;

an arcuate segment gear having an inner arcuate edge affixed circumferally about a circumferal portion of said steering post with said segment gear projecting radially upwardly therefrom into said casing chamber;

a row of a plurality of gear forming teeth extending along the circumferal arcuate edge of said segment gear completely between opposite ends of said segment gear;

a circular toothed gear member rotatively mounted to said casing and projecting inwardly of said casing chamber and having gear teeth disposed completely about the peripheral edge surfaces thereof, said teeth being in operative engagement with said arcuate segment gear teeth to be driven rotatively thereby in opposite directions about its axis upon rotation of said steering post in either direction about its axis;

coupling means connecting said opposite free end of said flexible cable to the axis of said circular toothed gear member for driving rotation thereby to effect simultaneous rotation of said indicating pointer upon the rotation of said circular gear which, in turn, rotates in a manner proportional to the degree of rotation of said steering post;

the rotation of said steering post effecting simultaneous similar type rotation of said flexible cable to drive said indicating pointer in a pivotal manner relative to said dial member to indicate the orientation of said vehicle steering wheels relative to said central longitudinal axis of said vehicle;

a distance indicator disposed in said housing compartment said distance indicator comprising:

a horizontal slot disposed in said dial member below the point of rotation of said indicating pointer;

a rotatable odometer type read-out mechanism disposed rearwardly of said slot inwardly of said housing compartment and having the indicating wheel members thereof visible through said slot exteriorly of said transparent member;

a flexible cable having one end connected to said read-out mechanism for drivingly rotating the same in opposite directions in a manner to increase and decrease the reading thereon depending upon the direction of rotation of said flexible cable;

said flexible cable extending outwardly of said back surface of said housing and terminating in a free end adapted to be positively connected to a speedometer and odometer cable of said vehicle to be drivingly rotated therewith in a manner proportional to the distance travelled by said vehicle in both a forward and a backward direction of movement of said vehicle;

a reset button operatively connected to said read-out mechanism for manually resetting the reading of said read-out mechanism to zero when desired by the vehicle operator;

whereby said distance indicator indicates on said read-out device the distance travelled by the vehicle in feet in both a forward and reverse direction.

* * * * *